(12) United States Patent
Iwasaki

(10) Patent No.: US 8,760,532 B2
(45) Date of Patent: Jun. 24, 2014

(54) IMAGING APPARATUS, CONTROL METHOD OF THE APPARATUS, AND PROGRAM

(75) Inventor: Takahiro Iwasaki, Kiyose (JP)

(73) Assignee: Canon Kabushiki Kaisha, Tokyo (JP)

(*) Notice: Subject to any disclaimer, the term of this patent is extended or adjusted under 35 U.S.C. 154(b) by 209 days.

(21) Appl. No.: 13/308,764

(22) Filed: Dec. 1, 2011

(65) Prior Publication Data

US 2012/0147214 A1    Jun. 14, 2012

(30) Foreign Application Priority Data

Dec. 8, 2010    (JP) .................................. 2010-273908
Nov. 22, 2011    (JP) .................................. 2011-255113

(51) Int. Cl.
    *H04N 5/228*    (2006.01)
(52) U.S. Cl.
    USPC .............. 348/222.1; 348/333.01; 348/333.04; 348/231.99; 348/231.4

(58) Field of Classification Search
    USPC ............... 348/222.1, 333.01–333.04, 231.99, 348/207.1, 231.4
    See application file for complete search history.

(56) References Cited

U.S. PATENT DOCUMENTS

2008/0007631 A1    1/2008    Abe
2010/0239176 A1*   9/2010    Yamakado et al. ........... 382/224

* cited by examiner

*Primary Examiner* — Yogesh Aggarwal
(74) *Attorney, Agent, or Firm* — Canon U.S.A., Inc., IP Division

(57) ABSTRACT

An imaging apparatus for capturing images, and arranging a plurality of captured images in a plurality of pages of an electronic document receives instructions for starting and cancelling a predetermined grouping status in response to operations of a user, stores and associates the captured images acquired in the predetermined status with the image frames in the same page among the plurality of pages, and stores the data.

7 Claims, 10 Drawing Sheets

FIG. 4

```
<?xml version="1.0" standalone="no"?>
<!DOCTYPE svg PUBLIC "-//W3C//DTD SVG 1.0//EN"
"http://www.w3.org/TR/2000/REC-SVG-20010904/DTD/svg10.dtd">
<svg width="600" height="400">
<status>EDITABLE</status>
<title>TRIP TO HAWAII</title>  ～410
  ～411
<background brightness="" mode="" xlink:href=""/>
<image id="1-1" x="2" y="2" width="640" height="480" xlink:href="IMG_0029.JPG"/>   413
<image id="1-2" x="4" y="6" width="640" height="480" xlink:href=""/>～414    412

<background brightness="" mode="" xlink:href=""/>
<image id="2-1" x="4" y="2" width="640" height="480" xlink:href=""/>
<image id="2-2" x="2" y="6" width="640" height="480" xlink:href=""/>

.
    .

</svg>
```

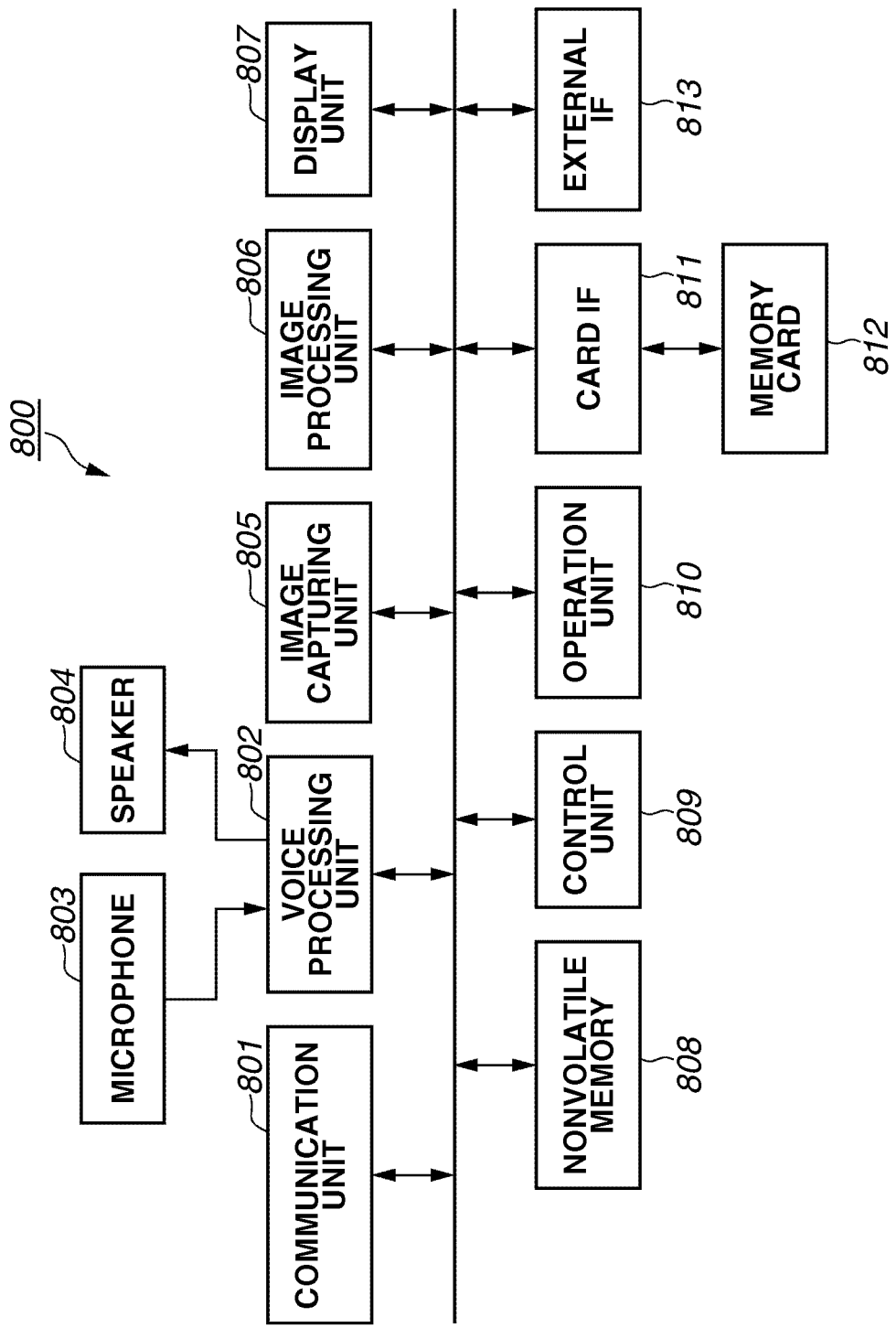

IMAGING APPARATUS, CONTROL METHOD OF THE APPARATUS, AND PROGRAM

BACKGROUND OF THE INVENTION

1. Field of the Invention

The present invention relates to an imaging apparatus, and more particularly relates to an imaging apparatus for creating an album while performing image capturing.

2. Description of the Related Art

Conventionally, for a digital camera that can create an album while capturing images, a technique for creating the album by displaying a through-the-lens image received from an image capturing unit in an image frame on a template is provided.

In creating the album while capturing the images, the user may want to arrange the images sequentially captured in an intended period in the same page. However, in the known technique, the user can only arrange the captured images on the certain template, and the plurality of captured images the user wants to arrange together is placed in different pages. Accordingly, it is not possible to create the album as the user intends.

SUMMARY OF THE INVENTION

According to an aspect of the present invention, an imaging apparatus for capturing images, and arranging a plurality of captured images in a plurality of pages of an electronic document is provided. The imaging apparatus includes a storage unit configured to store the captured images in association with image frames on the pages, and a reception unit configured to receive instructions for starting and cancelling a predetermined status in response to operations of a user. The storage unit stores and associates the captured images acquired in image capturing processing starting from when the reception unit receives the instruction for starting the predetermined status to when the reception unit receives the instruction for cancelling the status, with the image frames in the same page among the plurality of pages.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of data for display according to the exemplary embodiment of the present invention.

FIG. 8 is a block diagram illustrating a configuration of a cellular telephone according to an exemplary embodiment of the present invention.

DESCRIPTION OF THE EMBODIMENTS

Various exemplary embodiments, features, and aspects of the invention will be described in detail below with reference to the drawings.

The constituent elements described in the exemplary embodiments are only examples, and the scope of the present invention is not limited to the embodiments.

Figure 1:
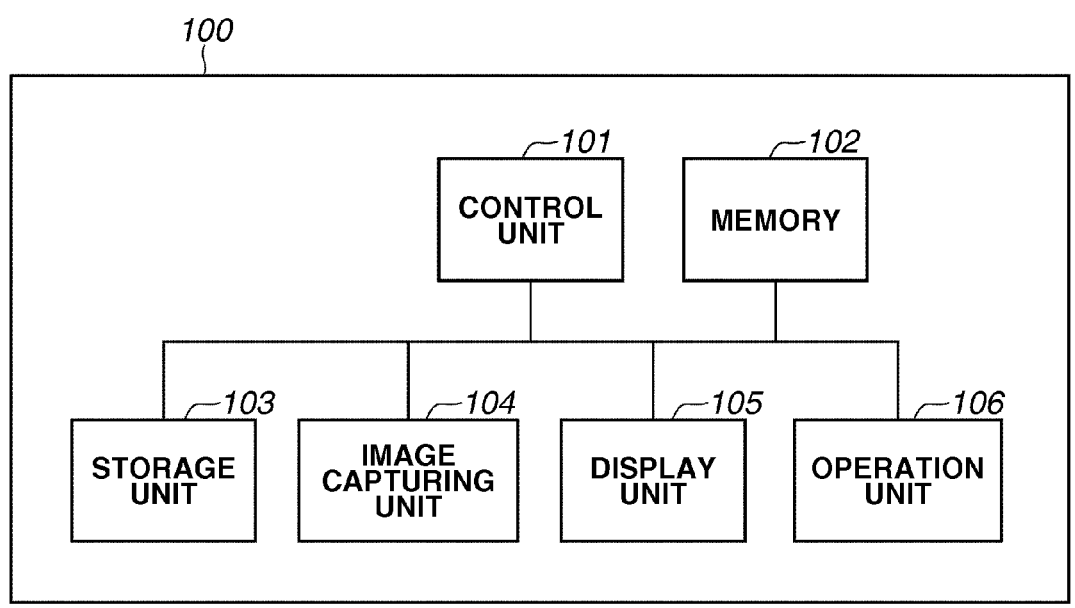
FIG. 1 is a block diagram illustrating a configuration of an imaging apparatus according to an exemplary embodiment of the present invention.

FIG. 1 illustrates an internal configuration of an imaging apparatus according to a first exemplary embodiment. In the exemplary embodiment, a digital camera will be described as an imaging apparatus 100. A control unit 101 performs overall control of the imaging apparatus 100. The control unit 101 includes, for example, a central processing unit (CPU). A memory 102 is used as a storage region for various types of data, for example, a storage region for a program to be executed mainly by the control unit 101, a work area during execution of the program, or a storage region for screen data to be displayed on a display unit 105, which is described below.

A storage unit 103 includes, for example, a flash memory and a hard disk. The storage unit 103 stores captured image data, a template for an electronic album, or the like. An image capturing unit 104 converts an analog signal acquired by capturing an image of an object, into digital data, performs data compression processing, for example, by using an adaptive discrete cosine transform (ADCT), and outputs the data as image data to the memory 102. The image capturing unit 104 also controls zooming, focusing, and diaphragm adjustment.

The display unit 105 displays a menu screen, a through-the-lens image, image data, or the like acquired as a result of the image capturing processing performed by the image capturing unit 104. The display unit 105 has a touch panel function, and includes, for example, a liquid crystal display, an organic electroluminescence display, or the like.

An operation unit 106 includes, for example, a button, a direction key, a dial, a touch panel, and a shutter button. The operation key 106 notifies the control unit 101 of the operation contents performed by the user. In the exemplary embodiment, as an electronic document, an example of an electronic album is described. However, the electronic document may be an electronic newspaper or the like created by arranging images and texts in a page.

Figure 2:
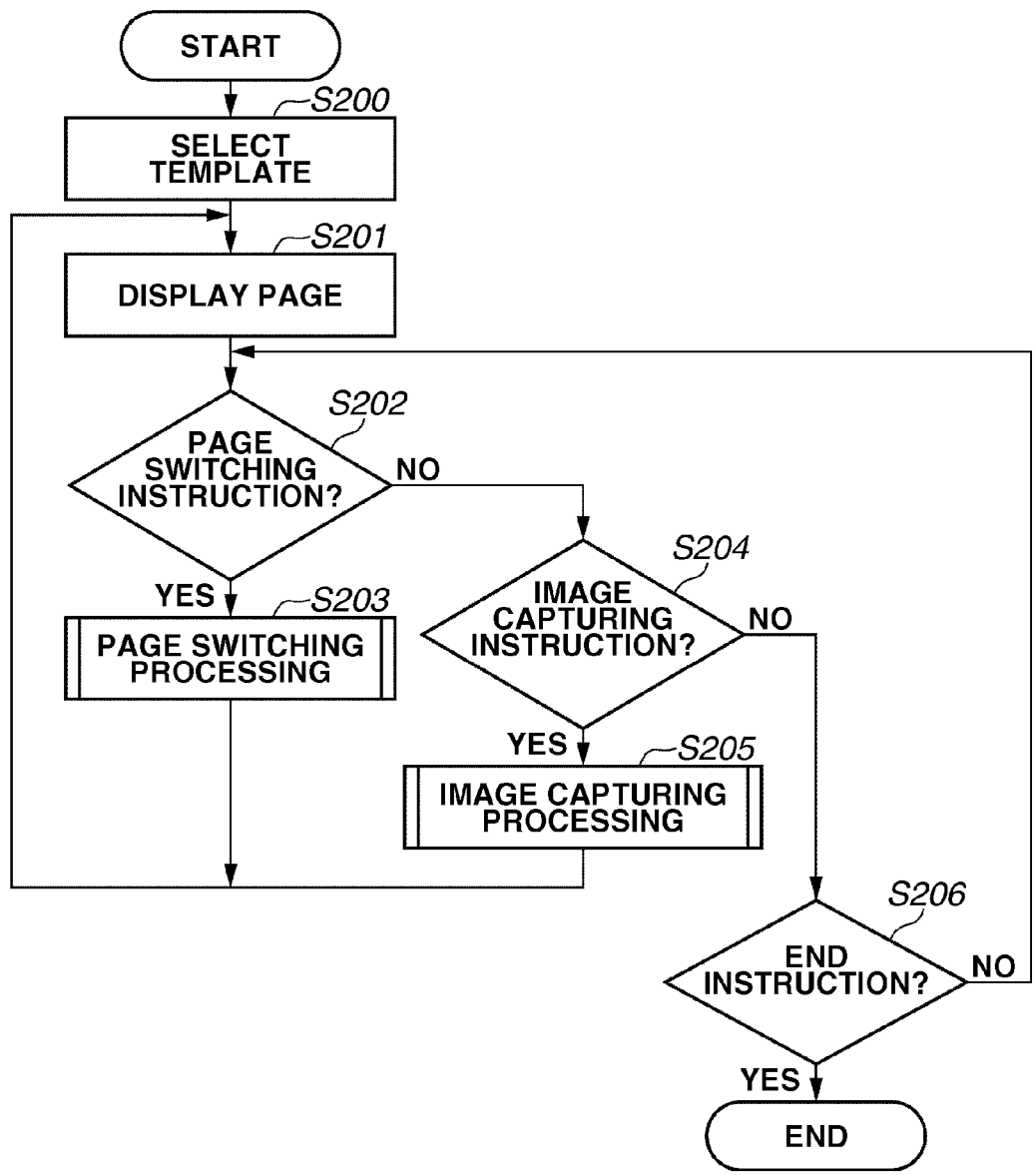
FIG. 2 is a flowchart illustrating an operation of the imaging apparatus according to the exemplary embodiment of the present invention.

FIG. 2 is a flowchart illustrating an operation of main processing of the imaging apparatus 100. The following operation is executed by the control unit 101 in the imaging apparatus 100 executing a program in the memory 102 and controlling each unit.

In step S200, the control unit 101 reads a list of templates for an electronic album from the storage unit 103, and displays the list on the display unit 105 to ask the user to select a template to be edited. The control unit 101 acquires a result of the selection of the user from the operation unit 106. Further, the control unit 101 reads the selected template from the storage unit 103, stores the template in the memory 102, and stores page numbers of first two pages as display target page numbers in the memory 102. In step S201, the control unit 101 performs display control such that a play-back screen including the two pages indicated by the display target page numbers in the template stored in the memory 102 is displayed on the display unit 105.

Figure 3A:
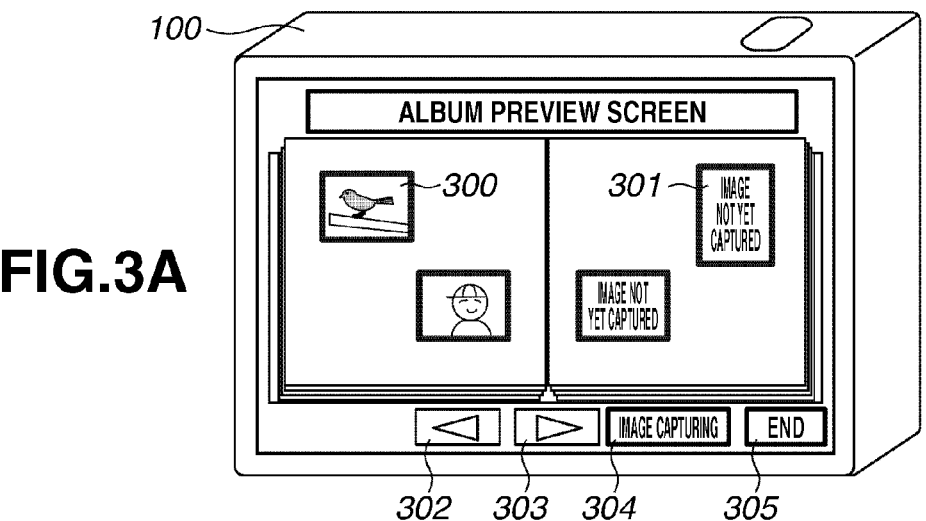
FIGS. 3A, 3B, and 3C illustrate examples of screens according to the exemplary embodiment of the present invention.

FIG. 3A illustrates an example of the album play-back screen displayed on the display unit 105 in step S201. An image frame 300 is already associated with image data. In the image frame 300, a thumbnail image of the image data is displayed. An image frame 301 is not yet associated with any image data. In the image frame 301, an alternative image indicating that no image data is associated with the image frame 301 is displayed. To each image frame, an image frame ID for uniquely identifying the image frame in the page is assigned. Each of the image frames has coordinate information indicating a location and a size on the page. A back button 302 and a forward button 303 inputs an instruction for switching album pages in response to an operation of the user. An image capturing button 304 inputs an instruction for switching the album play-back screen to an album image capturing screen, which will be described below, in response to an operation of the user. An end button 305 inputs an instruction for ending the album play-back screen.

FIG. 4 illustrates data for displaying the album play-back screen illustrated in FIG. 3A, on the display unit 105. The data for display in the exemplary embodiment is described in the Extensible Markup Language (XML) sources. A tag 410 indicates a title of the template. A tag 411 indicates a page break. In the tag 411, "locate" indicates the left side or the right side of a double-page spread in the album. A tag 412 indicates association with a background of the page. In the tag 412, "brightness" is a parameter indicating brightness of an image associated with the background image, and "mode" is a parameter indicating a method for processing the image associated with the background image.

Tags 413 and 414 indicate image frames on the template, and have IDs that are uniquely identified on the page. In FIG. 4, in a page whose page number is 2, the tag 413 indicates an image frame of "2-1", and the tag 414 indicates an image frame of "2-2". Parameters "x" and "y" indicate coordinates on the page, and parameters "width" and "height" indicate display sizes of the associated image. The tag 413 indicates that image data of IMG_0029.JPG is associated. The tag 414 indicates that no image frame is associated yet. An album image capturing screen, which will be described below, is displayed on the display unit 105 by using similar XML sources. In the exemplary embodiment, the example of the data for display is described by XML. The data for display can be similarly realized using other description languages.

In step S202, the control unit 101 determines whether an operation content notified from the operation unit 106 is an instruction for switching pages by an operation of the back button 302 or the forward button 303. If the instruction for switching the pages (YES in step S202) is given, in step S203, the control unit 101 updates the display target page number, switches the page to a page to be displayed on the play-back screen, and displays the page. Then, the processing returns to step S201. If the instruction is given by the operation of the back button 302, two pages are subtracted from the display target page number, and if the instruction is given by the operation of the forward button 303, two pages are added to the display target page number.

In step S204, the control unit 101 determines whether the operation content notified from the operation unit 106 is an image capturing instruction given by an operation of the image capturing button 304. If the operation content is the image capturing instruction (YES in step S204), in step S205, the control unit 101 performs image frame capturing processing, which will be described below.

In step S206, the control unit 101 determines whether the operation content notified from the operation unit 106 is an end instruction given by operation of the end button 305. If the operation content is the end instruction (YES in step S206), the control unit 101 ends the operation. In step S200, the control unit 101 may read a list of existing electronic albums in process of creation, from the storage unit 103 in addition to the template of the new electronic album, and display the list on the display unit 105 to ask the user to select the target of editing. If the existing electronic album in process of creation is selected, in step S201, the control unit 101 performs display control such that among pages having empty image frames in the selected electronic album, a play-back screen of two pages including a minimum page number is to be displayed on the display unit 105.

Figure 5:
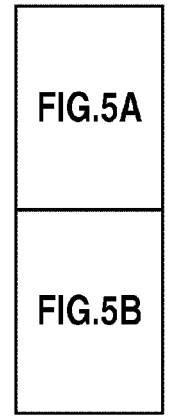
FIGS. 5A and 5B are a flowchart illustrating an operation of the imaging apparatus according to the exemplary embodiment of the present invention.
Figure 5A:
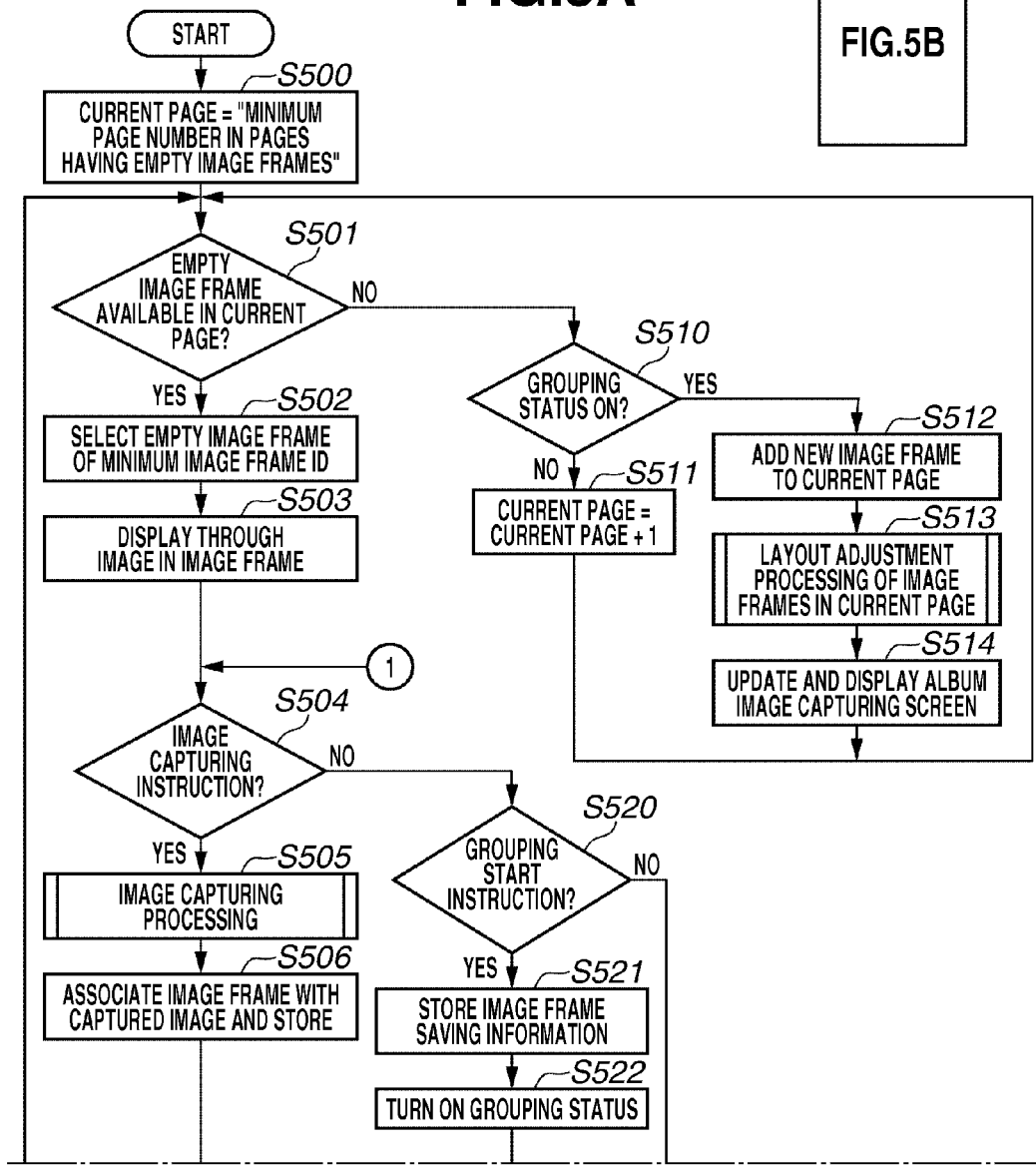
Figure 5B:
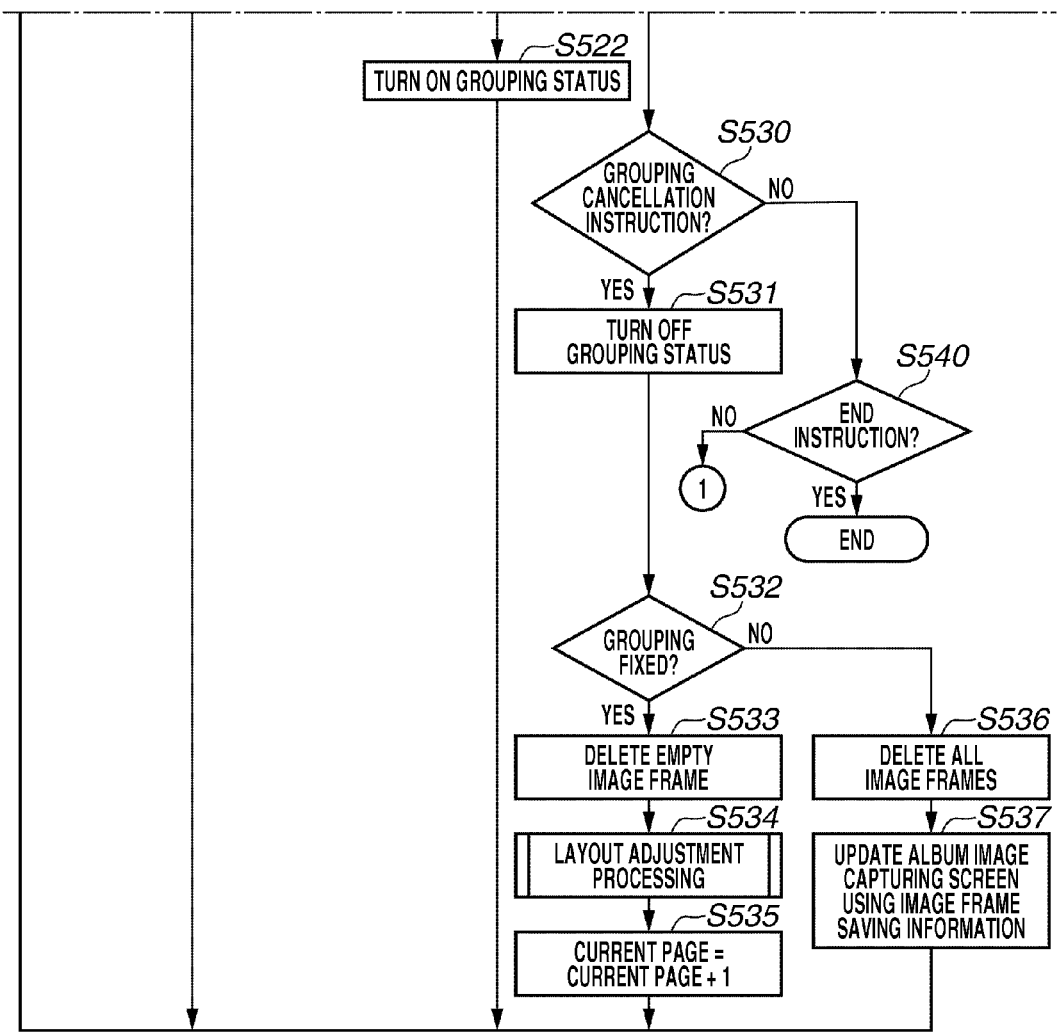

FIG. 5 is a flowchart illustrating the operation of the image frame image capturing processing (S205) in the imaging apparatus 100.

In step S500, as initial processing, the control unit 101 acquires a minimum page number as a current page among the pages having empty image frames, and stores the page number in the memory 102.

In step S501, the control unit 101 determines whether the current page has an empty image frame. If an empty image frame is available (YES in step S501), the processing proceeds to step S502. If no empty image frame is available (NO in step S501), the processing proceeds to step S510.

In step S501, if the empty image frame is available (YES in step S501), in step S502, the control unit 101 selects as an editing target image frame a frame whose image frame ID is the smallest among the empty image frames on the current page and stores the image frame in the memory 102. In step S503, the control unit 101 displays an image acquired from the image capturing unit 104 as a through-the-lens image in the editing target image frame.

Figure 3B:
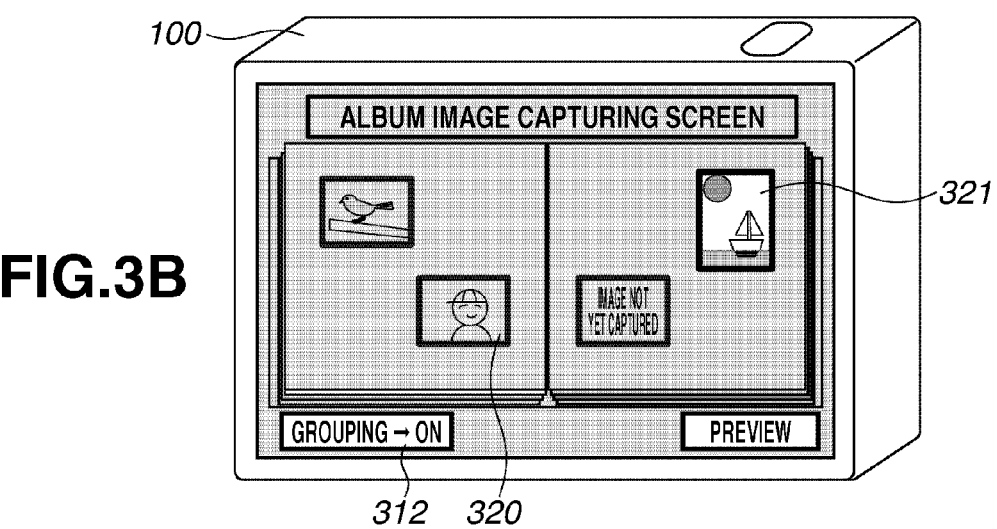

FIG. 3B illustrates an example of the album image capturing screen displayed on the display unit 105 in step S503. In an image frame 321, image data being captured is displayed as a through-the-lens image. A grouping ON button 312 is a button for issuing an instruction for switching a grouping status, which will be described below, to the ON status in response to an operation of the user.

In step S504, the control unit 101 determines whether the operation content notified from the operation unit 106 is an image capturing instruction given by an operation of a shutter button. If the content is the image capturing instruction (YES in step S504), in step S505, the control unit 101 performs the image capturing processing, and stores the image data output to the memory 102 from the image capturing unit 104, in the storage unit 103. In step S506, the control unit 101 stores the association between the image data stored in the storage unit 103 in step S505 and the image frame ID of the editing target image frame, in the storage unit 103.

If no empty image frame is available in step S501 (NO in step S501), in step S510, the control unit 101 determines whether the current grouping status stored in the memory 102 is ON. At the start of the image frame image capturing, the initial grouping status is OFF. If the current grouping status is OFF (NO in step S510), the control unit 101 adds one page to the current page number stored in the memory 102, and the processing returns to step S501 to proceed to processing for a next page.

If the current grouping status is ON (YES in step S510), in step S512, the control unit 101 adds a new image frame to the current page, and assigns a new image frame ID to the image frame. In step S513, in consideration of the balance with the newly added image frame within the page, the control unit 101 moves the existing image frames on the current page, and adjusts the display positions and the display sizes of the individual image frames. In step S514, the control unit 101 displays the current page to which the image frame is added, on the display unit 105. By carrying out the operation, while the grouping status is ON, the captured images can be arranged on the same page.

Figure 3C:
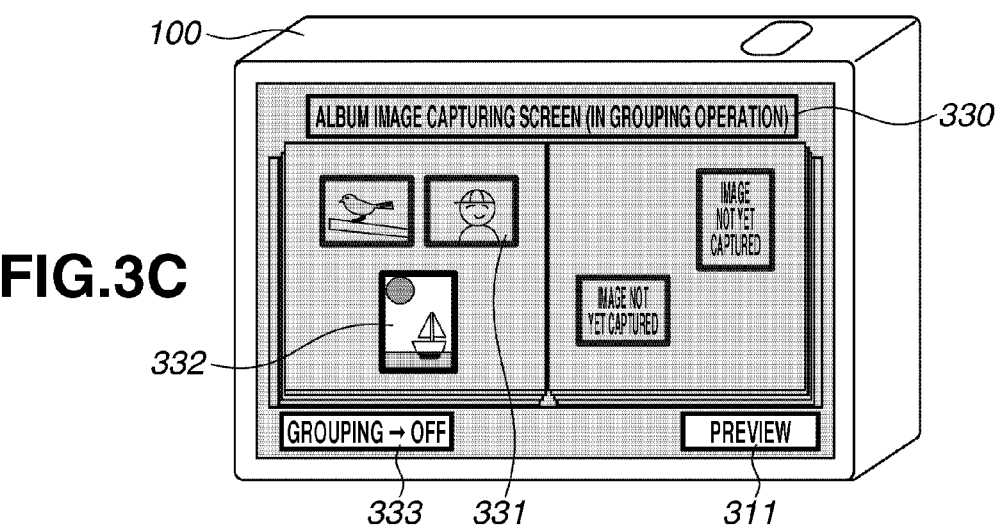

FIG. 3C illustrates an example of the album image capturing screen displayed on the display unit 105 in step S514. The album image capturing screen illustrated in FIG. 3B is displayed when the grouping status is OFF. After that, if a grouping ON button 312 is operated by the user and an instruction for starting the grouping status is received, the album image capturing screen illustrated in FIG. 3C is displayed on the display unit 105. A title 330 indicates that the grouping status is ON. In an image frame 331, a thumbnail image corresponding to the existing image frame in the current page and the image data acquired by previous image capturing is inserted and displayed. The image frame 331 in FIG. 3C corresponds to an image frame 320 in FIG. 3B, and the display position has been moved and the display size has been changed. An image frame 332 is the image frame newly added to the current page, which a through-the-lens image is inserted into and displayed. A grouping OFF button 333 is a button for issuing an instruction for switching the grouping status to OFF in response to an operation of the user. In the album image capturing screen in FIG. 3C, if the grouping OFF button 333 is pressed by an operation of the user, the album image capturing screen is switched to FIG. 3B.

In step S520, the control unit 101 determines whether the operation content notified from the operation unit 106 is an instruction for starting the grouping by an operation of the grouping ON button. If the operation content is the instruction for starting the grouping (YES in step S520), in step S521, the control unit 101 stores information of the all image frames contained in the current page as image frame saving information in the storage unit 103. In step S522, the control unit 101 changes the grouping status to ON, and the processing returns to step S501.

In step S530, the control unit 101 determines whether the operation content notified from the operation unit 106 is an instruction for cancelling the grouping by an operation of the grouping OFF button. If the operation content is the cancelling instruction of the grouping (YES in step S530), in step S531, the control unit 101 changes the grouping status stored in the memory 102 to OFF. In step S532, the control unit 101 displays a dialogue for asking the user to select whether to fix the grouping on the display unit 105, receives the selection of the user, and determines whether the grouping is to be fixed. If it is determined that the grouping is to be fixed (YES in step S532), in step S533, the control unit 101 deletes an image frame into which no image is inserted yet in the current page. In step S534, the control unit 101 performs layout adjustment processing similar to that in step S513 on the remaining image frames in the current page. In step S535, the control unit 101 adds one page to the current page number stored in the memory 102, and the processing returns to step S501 to proceed to processing for a next page. If it is determined that the grouping is not to be fixed (NO in step S532), in step S536, the control unit 101 deletes all image frames in the current page. In step S537, the control unit 101 reads the image frame saving information from the storage unit 103, arranges the original image frames and images in the current page according to the information, and displays the image frames and images on the display unit 105. By the operation, the grouping is abandoned. In step S537, the album image capturing screen illustrated in FIG. 3B is displayed. Thus, after the grouping status becomes OFF, an image to be captured next can be arranged in a different page.

In step S540, the control unit 101 determines whether the operation content notified from the operation unit 106 is an end instruction. For example, if the user presses a preview button 311, the end instruction is input, and the screen is switched to the album play-back screen. Alternatively, if images are inserted into all image frames in the electronic album, the end instruction is automatically input, and the screen is switched to the album play-back screen. If the control unit 101 determines that the operation content is the end instruction (YES in step S540), the control unit 101 ends the operation. If the control unit 101 determines that the operation content is not the end instruction (NO in step S540), the processing returns to the processing in step S504, and waits for an operation by the user.

If the processing is ended in response to an instruction by the user before the images are inserted into all image frames in the electronic album, the control unit 101 stores in the storage unit 103 the template into which the images captured so far are inserted, as a template for the electronic album being created. If the processing is ended after the images are inserted into all image frames in the electronic album, the control unit 101 creates a file of the electronic album from the template into which the images captured so far are inserted, and stores the file in the storage unit 103.

In the exemplary embodiment, in response to the operation by the user, ON and OFF of the grouping is manually switched. However, the switching may be automatically performed if a predetermined condition is satisfied. For example, at predetermined time, or if a predetermined face is recognized in an object, the grouping status may be automatically switched.

As described above, when the user edits the album while capturing an image, by simply issuing an instruction for starting or cancelling a predetermined status (grouping status), captured images of a desired number can be arranged in the same page, and it can be prevented that the captured images are arranged among different pages.

In the first exemplary embodiment, when the grouping status is changed from OFF to ON, the existing images on the current page and an image to be captured are grouped, and an image frame is added to the current page. In a second exemplary embodiment, when the grouping status is changed from OFF to ON, existing images in a current page and an image to be captured are grouped into different groups, a page break processing is performed, an image frame is added to a next page, and the grouping of the image to be captured is continued. In the description below, descriptions of configurations similar to those in the first exemplary embodiment are omitted, and characteristic configurations in the exemplary embodiment are described in detail.

Figure 6:
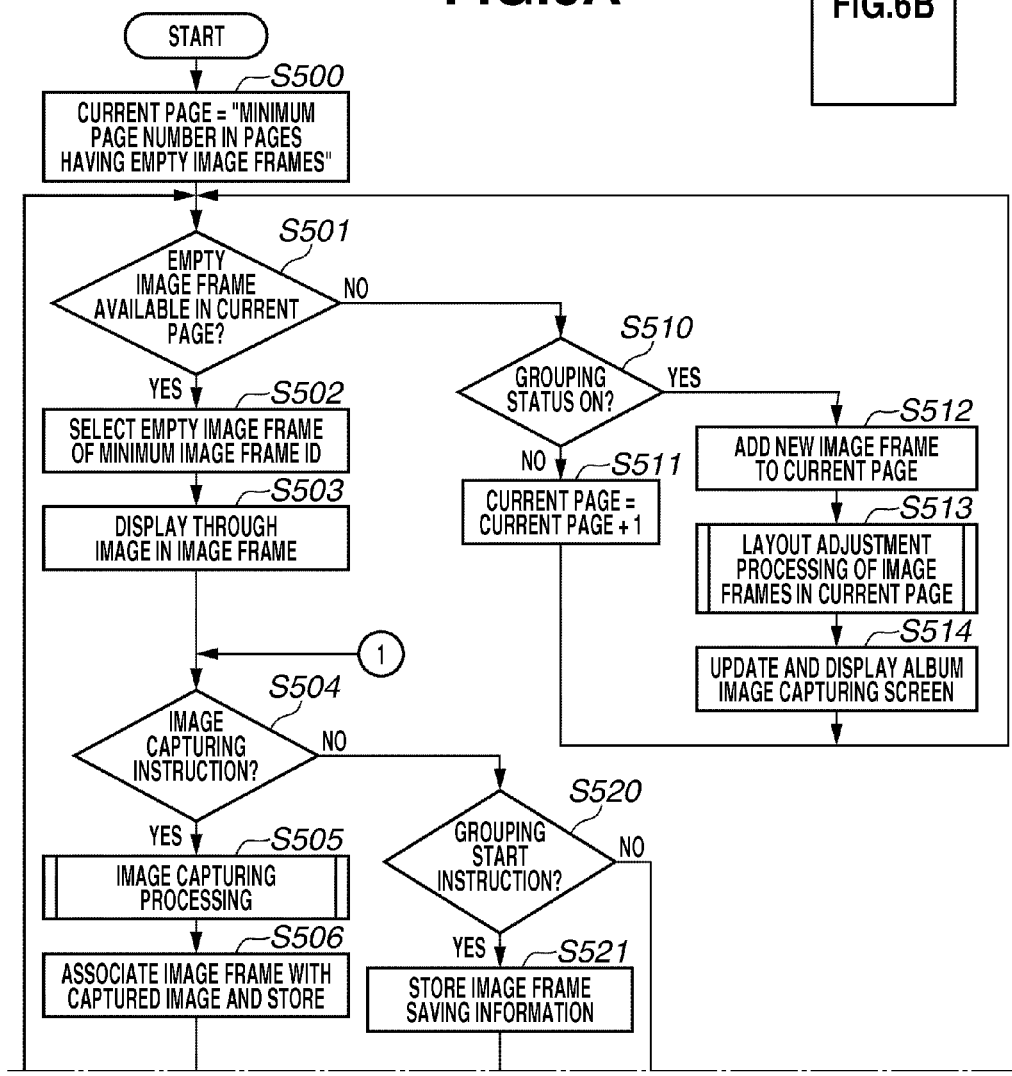
FIGS. 6A and 6B are a flowchart illustrating an operation of the imaging apparatus according to an exemplary embodiment of the present invention.
Figure 6A:
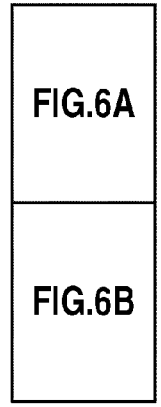
Figure 6B:
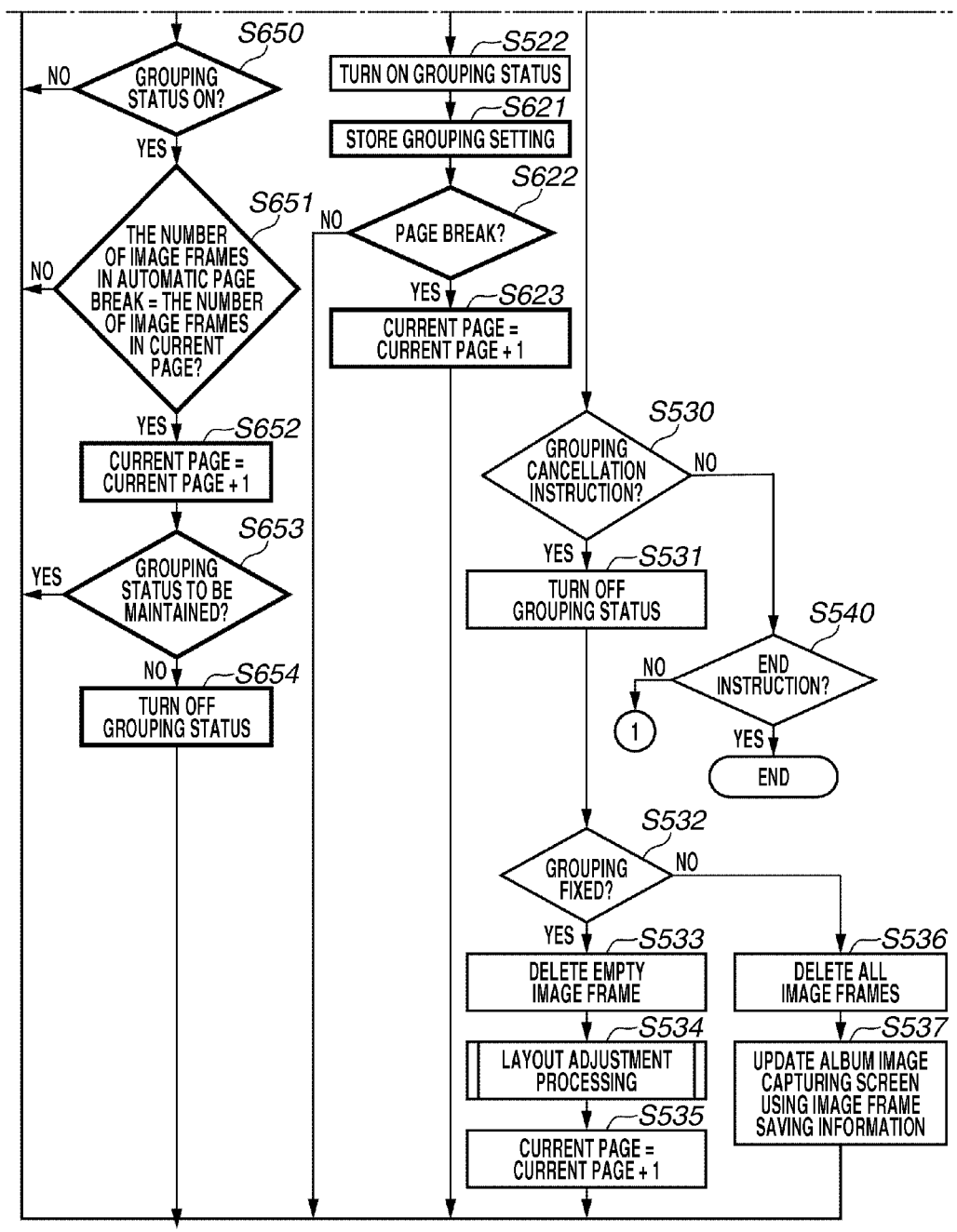

FIG. 6 is a flowchart illustrating the operation of the image frame image capturing processing (S205) in the imaging apparatus 100. To the processing similar to those in the image frame image capturing processing in FIG. 5, the same reference numerals are applied.

If the instruction for starting the grouping is issued (YES in step S520), after the processing in step S521 to S522 are performed, in step S621, the control unit 101 displays a grouping setting screen to ask the user to input a grouping setting, and stores the content of the grouping setting in the memory 102.

Figure 7:
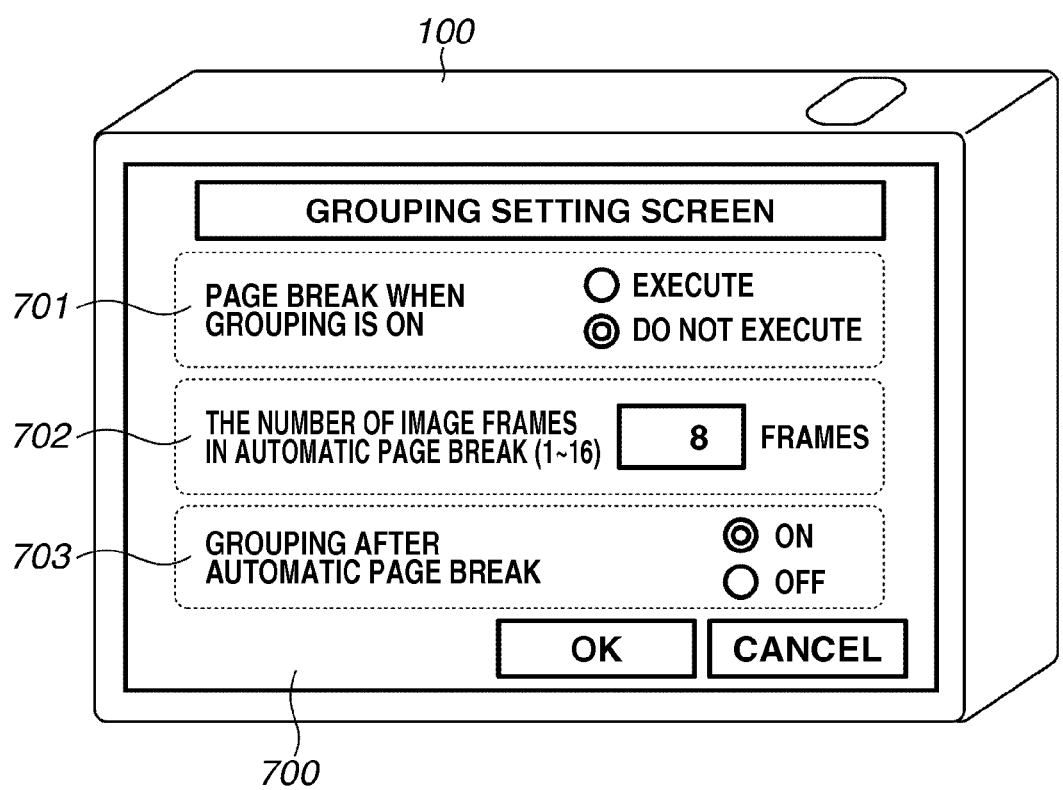
FIG. 7 illustrates an example of a screen according to the exemplary embodiment of the present invention.

FIG. 7 illustrates an example of a grouping setting screen 700. An item 701 is used to set whether to perform a page break processing when the grouping status is changed from OFF to ON. An item 702 is used to set an upper limit to the number of image frames to be arranged in one page when the grouping status is ON. In the exemplary embodiment, if the number of image frames arranged in the current page reaches an upper limit, the page break processing is automatically performed. An item 703 is used to set whether the grouping status is continued to be ON or to be changed to OFF when the number of image frames in the current page reaches the upper limit and the automatic page break processing is performed.

In step S622, the control unit 101 refers to the memory 102, and determines whether to perform the page break processing when the grouping status is switched to ON. If the control unit 101 determines to perform the page break (YES in step S622), in step S623, the control unit 101 adds one page to the current page number stored in the memory 102, and the processing returns to step S501 to proceed to processing for a next page. Thus, the user can lay out on the same new page images starting from the image currently captured at the head, to the following images to be captured.

If the control unit 101 determines that the page break is not to be performed (NO in step S623), the processing returns to step S501, and proceeds to processing to the current page.

If the instruction for capturing an image is issued (YES in step S504), after performing the processing in steps S505 to S506, in step S650, the control unit 101 determines whether the grouping status is ON. If the grouping status is OFF (NO in step S650), the processing returns to step S501, and proceeds to processing of the current page. If the grouping status is ON (YES in step S650), in step S651, the control unit 101 refers to the memory 102, and determines whether the number of image frames in automatic page break corresponds to the number of image frames existing in the current page. If the number of image frames in automatic page break corresponds to the number of image frames existing in the current page (YES in step S651), in step S652, the control unit 101 adds one page to the page number of the current page stored in the memory 102. In step S653, the control unit 101 refers to the memory 102, and determines whether to maintain an ON state of the grouping status after the automatic page break is performed. If the control unit 101 determines to continue the ON state of the grouping status after the automatic page break (YES in step S653), the processing returns to step S501, and proceeds to processing of a next page. If the control unit 101 determines to change the grouping status to OFF after the automatic page break (NO in step S653), in step S654, the control unit 101 changes the grouping status to OFF, and stores the information in the memory 102. If the number of image frames in automatic page break does not correspond to the number of image frames existing in the current page (NO in step S651), the processing returns to step S501, and proceeds to processing of the current page.

The exemplary embodiments of the present invention can be implemented by executing the following processing. Software (program) for performing the functions of the above-described exemplary embodiments is supplied to a system or apparatus via a network or various storage medium. A computer (or CPU or micro processing unit (MPU)) of the system or apparatus reads out and executes the program.

The imaging apparatus 100 according to the exemplary embodiments of the present invention can be realized by a cellular telephone. FIG. 8 is a block diagram illustrating a configuration of a cellular telephone 800 according to an exemplary embodiment of the present invention. The cellular telephone 800 according to the exemplary embodiment has a voice communication function, and further has an electronic mail function, an Internet connection function, an image capturing function, a reproduction function, and the like.

In FIG. 8, a communication unit 801 transmits or receives voice data or image data to/from other telephones using a communication method complying with a communication carrier the user contracts with. A voice processing unit 802, in voice communication, converts voice data from a microphone 803 into a format suitable for transmission, and transmits the data to the communication unit 801. The voice processing unit 802 decodes the voice data from the communication partner transmitted from the communication unit 801, and transmits the data to a speaker 804. An image capturing unit 805 captures an image of an object, and outputs the image data. An image processing unit 806 performs processing on the image data captured by the image capturing unit 805, during the image capturing, converts the data into a format suitable for recording, and outputs the data. An image processing unit 806 performs processing on the reproduced image, and transmits the image to a display unit 807, at the time of the reproduction of the recorded image. The display unit 807 includes a liquid crystal panel of several inches. The display unit 807 displays various types of screens in response to an instruction from a control unit 809. A nonvolatile memory 808 stores data, for example, information of an address book, data of electronic mails, and image data captured by the image capturing unit 805.

The control unit 809 includes a CPU, a memory, and the like. The control unit 809 controls each unit in the cellular telephone 800 according to a control program stored in a memory (not shown). An operation unit 810 includes a power button, a number key, and various operation keys for users to input data. A card IF 811 is used to record or reproduce various types of data in/from a memory card 812. An external IF 813 transmits the data stored in the nonvolatile memory 808 or the memory card 812 to an external device, and receives data transmitted from an external device. The external IF 813 performs communication using a known communication method, for example, a wired communication method such as a universal serial bus (USB), and a wireless communication method.

Next, the voice communication function in the cellular telephone 800 is described. When the user telephones someone, the user operates the number key on the operation unit 810 to input a number of the receiver, or displays an address book stored in the nonvolatile memory 808 on the display unit 807, selects the receiver, and transmits a message. In response to the instruction of the message transmission, the control unit 809 instructs the communication unit 801 to call the receiver. When the receiver receives the call, the communication unit 801 outputs voice data of the receiver to the voice processing unit 802 while transmitting the voice data of the user to the receiver.

In transmitting an electronic mail, the user instructs mail creation via the operation unit 810. In response to the mail creation instruction, the control unit 809 displays a screen for mail creation on the display unit 807. The user inputs a transmission address and body texts, and instructs transmission of the electronic mail via the operation unit 810. In response to the mail transmission instruction, the control unit 809 transmits the information of the address and the data of the mail body texts to the communication unit 801. The communication unit 801 converts the data of the mail into a format suitable for the communication and transmits the data to the receiver. When the communication unit 801 receives an electronic mail, converts the data of the received mail into a format suitable for display, and displays the data on the display unit 807.

Next, the image capturing function in the cellular telephone 800 is described. After the user operates the operation unit 810 and sets an image capturing mode, when the user issues an instruction for capturing a still image or a moving image, the image capturing unit 805 captures still image data or moving image data and transmits the data to the image processing unit 806. The image processing unit 806 processes the captured still image data or the moving image data, and stores the data in the nonvolatile memory 808. The image processing unit 806 transmits the captured still image data or the moving image data to the card IF 811. The card IF 811 stores the still image data or the moving image data in the memory card 812.

The cellular telephone 800 can transmit a file containing the still image data or the moving image data captured as described above as an attachment file of an electronic mail. Specifically, in transmitting the electronic mail, the user selects an image file stored in the nonvolatile memory 808 or the memory card 812, and instructs transmission of the file as an attachment file.

The cellular telephone 800 can also transmit the file containing the captured still image data or the moving image data through the external IF 813 to an external device such as a personal computer (PC) or other telephones. The user operates the operation unit 810, selects an image file stored in the nonvolatile memory 808 or the memory card 812, and instructs transmission of the file. The control unit 809 reads the selected image file from the nonvolatile memory 808 or the memory card 812, and controls the external IF 813 to transmit the image file to an external device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2010-273908 filed Dec. 8, 2010 and 2011-255113 filed Nov. 22, 2011, which are hereby incorporated by reference herein in their entirety.

What is claimed is:

1. An imaging apparatus for capturing images, and arranging a plurality of captured images in a plurality of pages of an electronic document, the imaging apparatus comprising:
a storage unit configured to store the captured images in association with image frames on the pages; and
a reception unit configured to receive instructions for starting and cancelling a predetermined status in response to operations of a user,
wherein, in a case where the reception unit has received instructions for starting the predetermined status, captured images that are acquired in image capturing processing while the predetermined status is being maintained are stored and associated by the storage unit with the image frames in the same page among the plurality of pages, and
wherein, in a case where the reception unit has not received instructions for starting the predetermined status, or in a case where the reception unit receives instructions to cancel the predetermined status, captured images that are acquired in image capture processing before starting the predetermined status, or after cancelling the predetermined status, are stored and associated by the storage unit with the image frames according to a predetermined template on one or more of the plurality of pages.

2. The imaging apparatus according to claim 1, further comprising:
an addition unit configured to add a new image to the same page if an image frame with which the captured image is associated is not provided in the same page in the period from the reception of the instruction for starting the predetermined status to the reception of the instruction for cancelling the status by the reception unit; and
an adjustment unit configured to adjust arrangement of the existing image frames and the added image frame in the same page,
wherein the storage unit stores the added image frame in association with the captured image.

3. The imaging apparatus according to claim 1, further comprising:
a page break unit configured to insert a page break to form a next page if the reception unit receives the instruction for starting the predetermined status,
wherein the storage unit stores and associates the captured image acquired in the image capturing processing starting from when the reception unit receives the instruction for starting the predetermined status to when the reception unit receives the instruction for cancelling the status with an image frame in the next page.

4. The imaging apparatus according to claim 1, further comprising:
a setting unit configured to set an upper limit to a number of image frames on the same page; and
an automatic page break unit configured to automatically insert a page break to form a next page if the number of image frames existing on the page reaches the set upper limit.

5. The imaging apparatus according to claim 4, wherein the reception unit automatically receives the instruction for canceling the predetermined status if the automatic page break unit inserts the page break to form the next page.

6. A control method of an imaging apparatus for capturing images, and arranging a plurality of captured images in a plurality of pages of an electronic document, the control method comprising:
storing the captured images in association with image frames on the pages;
receiving instructions for starting and cancelling a predetermined status in response to operations of a user; and
wherein, in a case where instructions are received for starting the predetermined statues, captured images that are acquired in image capturing processing while the predetermined status is being maintained, are stored and associated with the image frames in the same page among the plurality of pages, and
wherein, in a case where instructions are not received for starting the predetermined status, or in a case where instructions are received to cancel the predetermined status, captured images that are acquired in image capture processing before starting the predetermined status, or after cancelling the predetermined status, are stored and associated with the image frames according to a predetermined template on one or more of the plurality of pages.

7. A non-transitory storage medium storing a computer-readable program for instructing a computer in an imaging apparatus for capturing images, and arranging a plurality of captured images in a plurality of pages of an electronic document, to execute instructions, the program comprising:

storing the captured images in association with image frames on the pages;

receiving instructions for starting and cancelling a predetermined status in response to operations of a user; and wherein, in a case where instructions are received for starting the predetermined statues, captured images that are acquired in image capturing processing while the predetermined status is being maintained, are stored and associated with the image frames in the same page among the plurality of pages, and wherein, in a case where instructions are not received for starting the predetermined status, or in a case where instructions are received to cancel the predetermined status, captured images that are acquired in image capture processing before starting the predetermined status, or after cancelling the predetermined status, are stored and associated with the image frames according to a predetermined template on one or more of the plurality of pages.

* * * * *